(12) United States Patent
Nagai

(10) Patent No.: US 6,715,103 B1
(45) Date of Patent: Mar. 30, 2004

(54) AUTOMATIC FAULT DIAGNOSTIC NETWORK SYSTEM AND AUTOMATIC FAULT DIAGNOSTIC METHOD FOR NETWORKS

(75) Inventor: Ken Nagai, Tokyo (JP)

(73) Assignee: NEC Corporation, Tokyo (JP)

( * ) Notice: Subject to any disclaimer, the term of this patent is extended or adjusted under 35 U.S.C. 154(b) by 505 days.

(21) Appl. No.: 09/594,122

(22) Filed: Jun. 14, 2000

(30) Foreign Application Priority Data

Jun. 15, 1999 (JP) ............................................ 11-167930

(51) Int. Cl.$^7$ ................................................ G06F 11/00
(52) U.S. Cl. ............................ 714/25; 714/26; 714/48; 709/227
(58) Field of Search ............................. 714/25, 26, 48, 714/37, 43; 709/224

(56) References Cited

U.S. PATENT DOCUMENTS

| | | | | |
|---|---|---|---|---|
| 5,539,877 A | * | 7/1996 | Winokur et al. | 714/26 |
| 5,913,036 A | * | 6/1999 | Brownmiller et al. | 709/224 |
| 6,006,016 A | * | 12/1999 | Faigon et al. | 714/48 |
| 6,327,677 B1 | * | 12/2001 | Garg et al. | 714/37 |
| 6,480,972 B1 | * | 11/2002 | Cromer et al. | 714/25 |

FOREIGN PATENT DOCUMENTS

| | | |
|---|---|---|
| JP | 2-283139 | 11/1990 |
| JP | 02-288527 | 11/1990 |
| JP | 5-114899 | 5/1993 |
| JP | 05-244655 | 9/1993 |
| JP | 6-326751 | 11/1994 |
| JP | 7-226740 | 8/1995 |
| JP | 08-241255 | 9/1996 |
| JP | 08-083516 | 3/1997 |

OTHER PUBLICATIONS

Japanese Office Action dated May 23, 2003 with English translation of pertinent portions.

* cited by examiner

Primary Examiner—Robert Beausoliel
Assistant Examiner—Yolanda L Wilson
(74) Attorney, Agent, or Firm—Whitham, Curtis & Christofferson, PC

(57) ABSTRACT

An automatic fault diagnostic network system includes an automatic diagnostic system and a connection unit for connecting a plurality of network elements to the automatic diagnostic system. The automatic diagnostic system includes a fault detection unit for detecting an individual fault and a test unit for performing a test to find a cause of the individual fault in the network element in which the individual fault has occurred. An automatic network diagnostic method is also disclosed.

16 Claims, 3 Drawing Sheets

AUTOMATIC FAULT DIAGNOSTIC NETWORK SYSTEM AND AUTOMATIC FAULT DIAGNOSTIC METHOD FOR NETWORKS

BACKGROUND OF THE INVENTION

1. Field of the Invention

The present invention relates to an automatic fault diagnostic network system and an automatic fault diagnostic method for networks and, more particularly, to an automatic fault diagnostic network system and automatic fault diagnostic method for networks, which automatically diagnose a fault in a network element as a management target at the time of occurrence of the fault.

2. Description of the Prior Art

In general, a network management system for managing a network is connected to it, and the overall structure of the network as a management target and the connection states of network elements are displayed on a built-in display means. A network manager can check through this display means whether, for example, the network is normal or any fault has occurred in any network element.

In recent years, networks have rapidly increased in size and spread over wide areas. When a fault occurs in a network element, it is important to immediately take necessary measures to eliminate this. For this reason, demands have arisen for means by which network managers can properly cope with faults on networks. As such a means, a network management system is constructed from a fault log creation/storage means for automatically detecting a network element in which a fault has occurred, automatically creating a fault log on which at least the name of the network element and the type of fault are recorded, and recording the log, a trouble ticket issuing means for issuing a trouble ticket on which the detailed information recorded on the fault log can be recorded, and a trouble ticket storage means for storing the trouble ticket on which the detailed information is recorded. With such a system, an attempt has been made to improve network management performance at the time of occurrence of a network fault.

The anti-network fault management system disclosed in Japanese Unexamined Patent Publication No. 06-326751 is an example of this system. FIG. 1 is a block diagram showing the function/arrangement of the network management system disclosed in this reference. The arrangement and function of a conventional network management system will be described with reference to FIG. 1. A general network management system includes a display unit 101 for displaying a network as a management target in a diagrammatic form, a control section 102 which is connected to the display unit 101 to control the contents displayed on the display unit 101 or controls an operation unit 104 and database 103, the operation unit 104 which is connected to the control section 102 to provide it with a signal for designating display contents, and the database 103 which is connected to the control section 102 to store the contents of the network which are to be displayed.

Such a network management system is connected to the network constituted by network elements as management targets through a connection unit. When a fault occurs in one of the network elements, this system displays fault information on the display unit 101, creates a fault log, and stores it in the database 103. In the above reference, in particular, there is disclosed an idea that enables a user to quickly find a solution method for a new fault at the time of occurrence of the fault upon referring to a fault log recorded in the past by issuing a trouble ticket on which measures taken against faults by the network manager are also recorded.

According to conventional techniques associated with network management systems, as in the above example, the network management performance can be improved to some extent by issuing or storing a trouble ticket on which a fault log is recorded/updated. With the conventional techniques and methods, however, an improvement in network fault diagnostic function is undesirably limited, and basic problems in network management remain unsolved. The first problem in network management by the conventional network management system is that a network manager must acquire sufficient experience associated with diagnosis because the system has no diagnostic function of acquiring appropriate fault information that enables a search for the cause of the fault, although the system allows the manager to check the occurrence of the fault and its contents to some extent. This problem arises because there is no means that automatically diagnoses a network element in which a fault has occurred.

The second problem in network management is that the network manager must perform determination or operation by himself/herself to check whether a network element in which a fault has occurred can be diagnosed. If, therefore, it is unclear whether each network element has a diagnostic function, or a network maintenance person without any know-how about diagnosis is to perform operation, this problem brings great difficulties in taking countermeasures against network faults.

The third problem in network management is that even if a means for executing diagnosis is prepared because of the necessity of the execution of diagnosis for a search for the cause of a fault, a maintenance person must check a fault in a network element first, and then give the network element an instruction to execute diagnosis from a system other than this network management system. As described above, the conventional network management system has no effective means for taking proper measures against a fault on a network and reducing the work load on a maintenance person.

It is therefore required to automatically find the cause of a fault on the basis of the fault and diagnosis.

SUMMARY OF THE INVENTION

It is an object of the present invention to provide an automatic fault diagnostic network system and an automatic fault diagnostic method for networks, which can automatically find the cause of a fault on the basis of fault diagnosis.

It is another object of the present invention to provide an automatic fault diagnostic network system and automatic fault diagnostic method for networks, which can automatically find the cause of a fault on the basis of fault diagnosis by performing autonomous determination on a detected fault instead of making a network manager perform determination and operation to check whether diagnosis of a network element in which the fault has occurred can be made.

In order to achieve the above objects, according to the present invention, there is provided an automatic fault diagnostic network system comprising an automatic diagnostic system and a connection unit for connecting a plurality of network elements to the automatic diagnostic system, wherein the automatic diagnostic system comprises a fault detection unit for detecting an individual fault, and a test unit for running a test to find a cause of the individual fault in the network element in which the individual fault has occurred. This system actively searches for the cause of an individual fault by a test as well as detecting the fault, thereby automating fault processing.

In addition, the system includes a database, and the database stores a plurality of fault data corresponding to a plurality of faults. This allows the test unit to precisely test and determine the cause of the individual fault on the basis of the fault data corresponding to the individual fault detected by the fault detection unit.

The fault data includes the type of network element and fault contents. In many cases, the types of faults that occur in elements are known in advance. The contents of such faults are registered in the database in advance. The contents of a newly detected fault are registered in the database in correspondence with an element every time it is detected.

Information that can specify the contents of a fault is a correspondence between the type of element, e.g., the model or name of the element, and the fault contents. Such a correspondence table is formed in the database. Identical faults occur in elements of the same type. Certain faults occur in only specific types of devices. It is preferable that fault data further include diagnosis execution enable/disable information and diagnosis execution necessity information. With regard to a fault for which no diagnostic test, i.e., test, can be performed, information indicating that diagnosis cannot be executed is preferably prepared. It is also important to have diagnosis necessity information because some fault need not be diagnosed even though it can be diagnosed.

An automatic fault diagnostic method for networks according to the present invention comprises the steps of detecting a fault in a network element, making the fault correspond to fault contents in accordance with the type of element, and confirming the fault contents by testing the fault in accordance with the fault contents. Confirming fault contents is equivalent to finding the cause of a fault. If the cause of a fault is detected, the fault can be recovered by using a conventional means.

As is obvious from the above aspects, the automatic fault diagnostic network system and automatic fault diagnostic method for networks according to the present invention can specify the cause of a fault by executing a test for diagnosis of a network element in which the fault has occurred. If the cause of the fault is specified, the element can be recovered. It can also be determined whether diagnosis can be performed. In addition, even if diagnosis can be performed, it is determined whether diagnosis is necessary. Thereafter, a diagnostic test is executed.

The following effects can be additionally obtained.

(1) When a fault occurs in a network element, processing up to diagnosis can be automatically executed without any manual operation.

(2) Both the fault information and a diagnosis result can be quickly checked. This reduces the amount of work performed by a maintenance person.

(3) Since a diagnosis result can be analyzed by extracting data from the database, appropriate and sophisticated measures can be taken against a fault.

(4) With the above effects, the processing speed and accuracy in network management can be increased regardless of the state of a network and the skill of a maintenance person.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Preferred Embodiments of the present invention will be described below with reference to the accompanying drawings.

Figure 1:
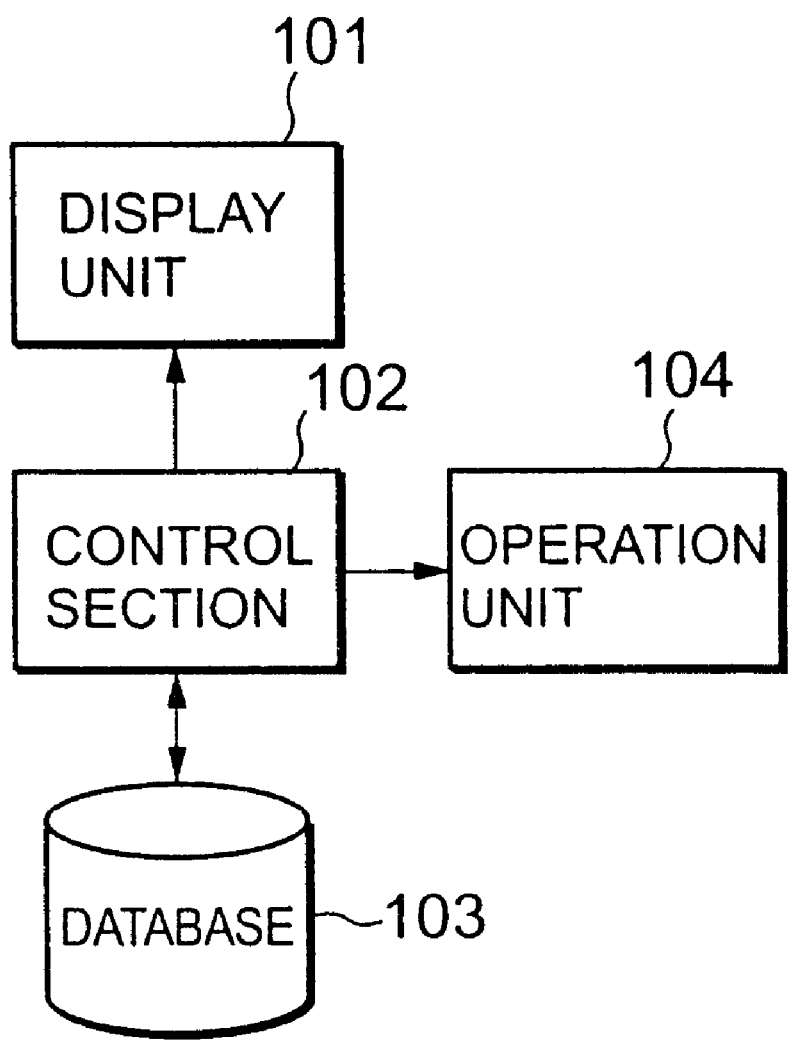
FIG. 1 is a block diagram showing the function/arrangement of a conventional anti-network fault management system.
Figure 2:
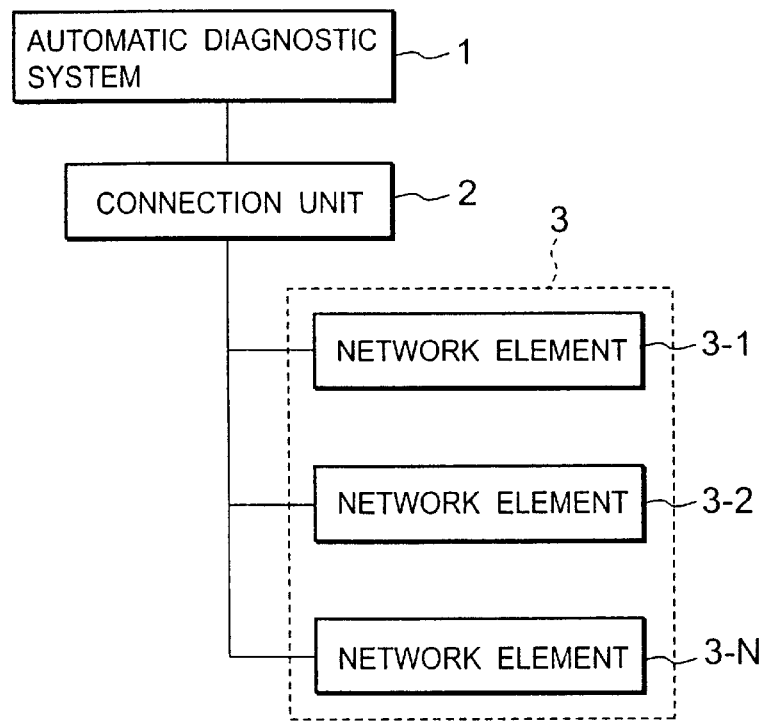
FIG. 2 is a block diagram showing the schematic arrangement of an automatic fault diagnostic network system according to an embodiment of the present invention.

In an embodiment of an automatic fault diagnostic network system according to the present invention, an automatic diagnostic system is connected to a network. As shown in FIG. 2, a network element group 3 is connected to an automatic diagnostic system 1 through a connection unit 2. The network element group 3 includes N network elements 3-1, 3-2, . . . , 3-N.

Figure 3:
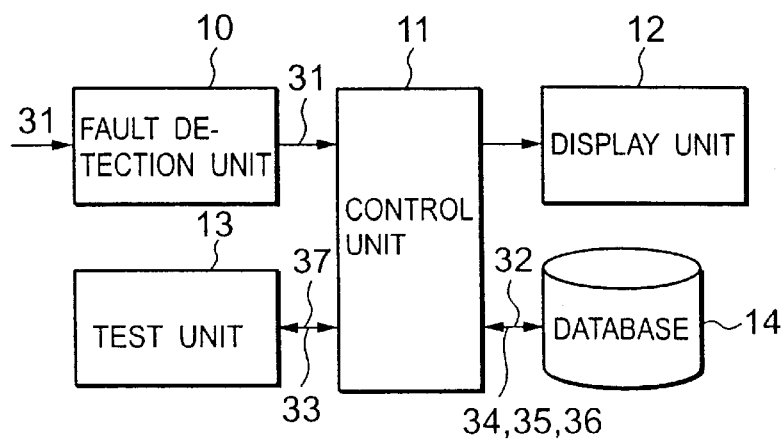
FIG. 3 is a block diagram showing the details of an automatic diagnostic system in the embodiment shown in FIG. 2.

FIG. 3 shows the system circuit of the automatic diagnostic system 1. The automatic diagnostic system 1 is comprised of a fault detection unit 10, control unit 11, display unit 12, test unit 13, and database 14. The fault detection unit 10 and test unit 13 are connected to the control unit 11. The control unit 11 is independently connected to the display unit 12 and database 14. Fault information 31 of the network element 3-N in which a fault has occurred is detected by the fault detection unit 10.

The fault information 31 is sent from the fault detection unit 10 to the control unit 11. The fault information 31 sent from the fault detection unit 10 is displayed on the display unit 12 by the control unit 11 and stored in the database 14. The database 14 has diagnosis enable/disable information 32. The control unit 11 determines, on the basis of the fault information 31 and the diagnosis enable/disable information 32 stored in the database 14, whether to execute diagnosis of the network element 3-N. Upon determining that the diagnosis is required and can be executed, the control unit 11 gives an instruction to execute diagnosis to the test unit 13.

A diagnosis result 33 on the network element 3-N which is obtained by the test unit 13 after it executes a test in accordance with the diagnosis instruction is sent from the test unit 13 to the control unit 11. The diagnosis result 33 is displayed on the display unit 12 as information with which the network manager takes measures against the fault, and is also recorded on the database 14 as diagnosis result data 34 corresponding to the fault in the network element 3-N. The diagnosis result data 34 is held in the database 14 as information that can be made to correspond to an identical fault caused afterward on the network.

Figure 4:
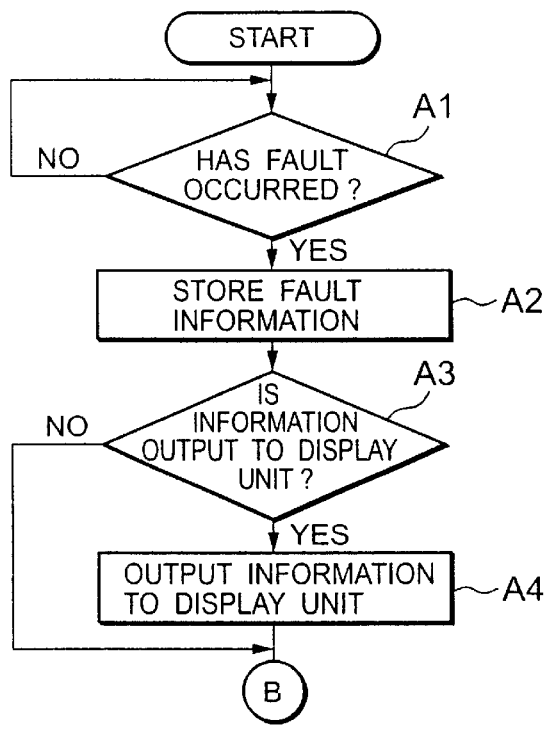
FIG. 4 is a flow chart showing an example of an automatic fault diagnostic method according to the present invention.

FIG. 4 shows an embodiment of an automatic fault diagnostic method for networks according to the present invention. When a fault occurs in any element of the network element group 3, the fault detection unit 10 detects the fault information 31 (step A1), and sends the fault information 31 to the control unit 11. The fault information 31 is stored in the database 14 through the control unit 11 (step A2).

Output necessity information indicating whether to output fault information of each network element to the display unit 12 is registered in the database 14 in advance. The control unit 11 reads the output necessity information (step A3) to check whether it is necessary to output the information to the network element 3-N. If it is necessary to output the information, the fault information 31 is output to the display unit 12 (step A4).

Figure 5:
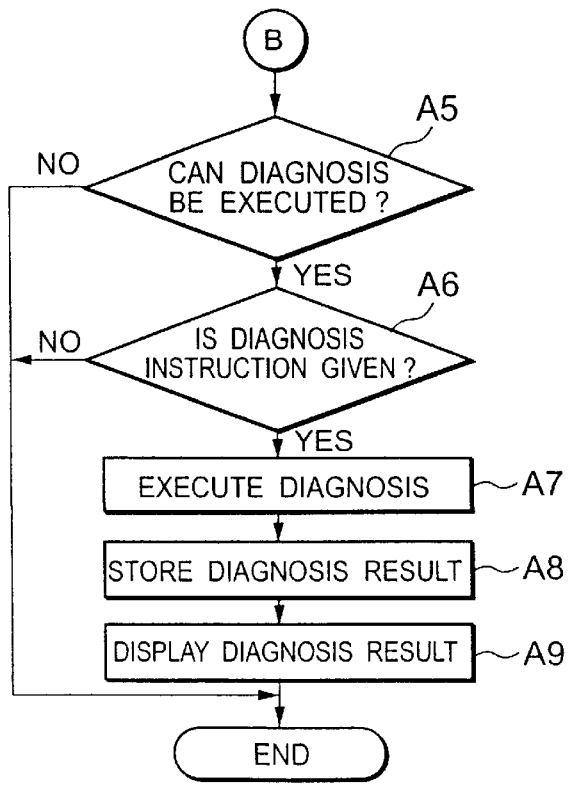
FIG. 5 is a flow chart showing another example of the automatic fault diagnostic method according to the present invention.

FIG. 5 shows the subsequent steps in the embodiment of the automatic fault diagnostic method for networks. Diagnosis enable/disable information 35 indicating whether diagnosis can be made on a fault in each network element is registered in the database 14 in advance. The control unit 11 reads the diagnosis enable/disable information 35 (step A5), and checks whether diagnosis of the fault in the network element 3-N can be executed. If it is determined that the diagnosis cannot be performed, the processing is terminated.

Diagnosis necessity information 36 indicating whether an instruction to execute diagnosis is given when a fault occurs in each network element is registered in the database 14 in advance. The control unit 11 reads the diagnosis necessity information 36 (step A6) to check whether diagnosis about the fault in a network element. If it is determined that the diagnosis is unnecessary, the processing is terminated.

If it is determined that diagnosis of the network element can be executed and an instruction to execute diagnosis is given at the time of occurrence of the fault is given, the automatic fault diagnostic network system of the present invention causes the test unit 13 to execute a test on the network element 3-N (step A7). Upon completion of the test, the control unit 11 receives the diagnosis result 33 associated with the network element 3-N from the test unit 13 (step A8). The diagnosis result 33 is then sent to the database 14 through the control unit 11. The diagnosis result can be output/displayed on the display unit 12 (step A9).

As described above, when a fault occurs in the network element 3-N, operations for detection, diagnosis and test are automatically executed without any manual operation. The maintenance person can check not only the fault information but also the diagnosis result based on the test through the display unit 12. This reduces the amount of work performed by the maintenance person, and allows the person to quickly take measures against the fault upon analyzing the diagnosis result. Diagnosis of each network element is automatically determined by reading out the diagnosis enable/disable information and diagnosis necessity information registered in the database 14. Therefore, network managing operation is not influenced by the technical level of the maintenance person.

Although fault information is displayed on the display unit 12 before diagnosis (step A4), an arbitrary display timing can be set for fault information. In this case, both the fault information and the diagnosis result can be displayed after the diagnosis. This makes it possible to shorten the time interval between the instant at which a fault occurs and the instant at which diagnosis of the corresponding network element is started.

In the above embodiment, an inquiry about fault information display or necessity of diagnosis execution is made with respect to the database (step A3 or A6), and processing for fault information display or diagnosis execution (step A4 or A7) is executed only if it is determined that fault information display or diagnosis execution is necessary. However, display/non-display operations and diagnosis/non-diagnosis operations can be arbitrarily combined to display all fault information and execute all diagnoses, display no fault information, or execute no diagnosis. This makes it possible to set management conditions corresponding to the maintenance system of each network element or the presence/absence of a maintenance person, thus making operation in network management flexible.

In the above embodiment, the fault detection unit 10 and test unit 13 are discrete units. However, they can be integrated into one interface for network elements. This integration makes it possible to increase the processing speed of the automatic fault diagnostic network system and reduce the apparatus cost.

In the above embodiment, the test unit 13 is used to diagnose a network element in which a fault has occurred. However, this system may have a program having a fault recovery function for each network element as well as a diagnostic function. With this fault recovery program, processing up to fault recovery can be autonomously performed without any manual operation if a target network element is an element in which fault recovery can be performed. This allows fault information and recovery information to be stored in the database 14.

In the above embodiment, the system makes diagnosis of a network element in which fault information is detected by the fault detection unit 10. However, a diagnosis target is not limited to a network element, and the network itself is set as a diagnosis target. This allows systematic management of the overall network.

What is claimed is:

1. An automatic fault diagnostic network system comprising an automatic diagnostic system and a connection unit for connecting a plurality of network elements to said automatic diagnostic system, wherein said automatic diagnostic system comprises a fault detection unit for detecting an individual fault, a test unit for running a test to find a cause of the individual fault in said network element in which the individual fault has occurred, means for determining that said test is required and can be executed, and a fault recovery function, wherein if said network element can be recovered said recovery is executed automatically.

2. A system according to claim 1, wherein said automatic diagnostic system further comprises a database, said database stores a plurality of fault data corresponding to a plurality of faults, and said test unit is configured to run a test to find the cause of the individual fault on the basis of the fault data corresponding to the individual fault detected by said fault detection unit.

3. A system according to claim 2, wherein the fault data includes a type of network element and fault contents.

4. A system according to claim 3, wherein the fault data further includes diagnosis execution enable/disable information and diagnosis execution necessity information.

5. The system according to claim 1, further comprising a display unit for presenting said detected individual fault and a result of said test to a network manager.

6. The system according to claim 5, wherein display of said detected individual fault is delayed so that both the fault information and the results of the test are presented to said network manager after the test.

7. The system according to claim 5, wherein said detected individual fault is not displayed to said network manager if said test is not required.

8. The method according to claim 1, wherein the network element diagnosed by said diagnostic system is the network itself.

9. An automatic network diagnostic method comprising the steps of:
- detecting a fault in a network element;
- making the fault correspond to the fault contents in accordance with a type of the element;
- confirming the fault contents by testing the fault in accordance with the fault contents,
- determining that said testing is required and can be executed, and
- recovering a fault wherein if said network element can be recovered said recovery is executed automatically.

10. The method according to claim 9, further comprising the step of storing in a database a plurality of fault data corresponding to a plurality of faults, wherein said testing is executed on the basis of the fault data stored in said database corresponding to the individual fault detected by said detecting step.

11. The method according to claim 10, wherein the fault data includes a type of network element and fault contents.

12. The method according to claim 11, wherein the fault data further includes diagnosis execution enable/disable information and diagnosis execution necessity information.

13. The method according to claim 9, further comprising the step of displaying said detected fault and a result of said testing step to a network manager.

14. The method according to claim 13, wherein display of said detected fault is delayed so that both the fault information and the results of the testing step are displayed to said network manager after the testing step.

15. The method according to claim 13, wherein said detected fault is not displayed to said network manager if said test is not required.

16. The method according to claim 9, wherein the network element diagnosed by said diagnostic method is the network itself.

* * * * *